US009397506B2

(12) United States Patent
Keates

(10) Patent No.: US 9,397,506 B2
(45) Date of Patent: Jul. 19, 2016

(54) VOLTAGE MANAGEMENT DEVICE FOR A STACKED BATTERY

(75) Inventor: Andy Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 14/006,224

(22) PCT Filed: Oct. 1, 2011

(86) PCT No.: PCT/US2011/054500
§ 371 (c)(1),
(2), (4) Date: Sep. 19, 2013

(87) PCT Pub. No.: WO2013/048539
PCT Pub. Date: Apr. 4, 2013

(65) Prior Publication Data
US 2014/0009105 A1    Jan. 9, 2014

(51) Int. Cl.
*H02J 7/00* (2006.01)
*H01M 10/42* (2006.01)
*H01M 10/44* (2006.01)
*H01M 10/48* (2006.01)

(52) U.S. Cl.
CPC ........... *H02J 7/0013* (2013.01); *H01M 10/425* (2013.01); *H01M 10/441* (2013.01); *H01M 10/482* (2013.01); *H02J 7/0065* (2013.01)

(58) Field of Classification Search
CPC .................................................. H01M 10/425

USPC ......................................................... 320/103
See application file for complete search history.

(56) References Cited

U.S. PATENT DOCUMENTS

| 4,153,869 | A |  | 5/1979 | Ragaly |
| 4,788,486 | A |  | 11/1988 | Mashino et al. |
| 2011/0234151 | A1 |  | 9/2011 | Uan-Zo-li et al. |
| 2012/0049801 | A1 | * | 3/2012 | Chang .............. H02J 7/0016 320/132 |

FOREIGN PATENT DOCUMENTS

| JP | 07-273715 A | 10/1995 |
| JP | 2004-215449 A | 7/2004 |
| JP | 2005-102411 A | 4/2005 |
| WO | WO 2011/103469 A2 | 8/2011 |
| WO | 2013/048539 A1 | 4/2013 |

OTHER PUBLICATIONS

International Search Report dated Apr. 12, 2012 for corresponding Application No. PCT/US2011/054500.

(Continued)

*Primary Examiner* — Thuan Do
(74) *Attorney, Agent, or Firm* — KED & Associates LLP

(57) ABSTRACT

An apparatus is provided that includes a first terminal to couple to a first node of a stacked battery pack having a first cell block and a second cell block, a second terminal to couple to a second node between the first cell block and the second cell block, and a voltage management circuit to detect an output voltage at the second terminal and to adjust energy within the battery pack based on the output voltage to be detected at the second terminal.

18 Claims, 3 Drawing Sheets

(56) References Cited

OTHER PUBLICATIONS

Office Action received for Taiwan Patent Application No. 101133987, mailed on May, 22, 2014, 6 pages of English Translation and 4 pages of Office Action.

International Preliminary Report on Patentability and Written Opinion received for PCT Patent Application No. PCT/US2011/054500, mailed on Apr. 10, 2014, 5 pages.

Chinese Office Action for application 201180074562.5 dated Oct. 23, 2015.

* cited by examiner

VOLTAGE MANAGEMENT DEVICE FOR A STACKED BATTERY

FIELD

Embodiments may relate to a voltage management device for a stacked battery.

BACKGROUND

Battery life is a key feature of electronic devices (or platform loads). However, a battery voltage decays as it discharges. FIG. 1 shows an example of a power system in which a battery 10 may provide a direct current (DC) at a variable voltage to a voltage regulator 20. The voltage regulator 20 may adjust the received voltage input to a voltage output, which may then be provided to a platform load 30. As one example, the voltage input to the voltage regulator 20 may vary between 9 volts and 12.6 volts and the voltage output from the voltage regulator 20 may be 2 volts.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
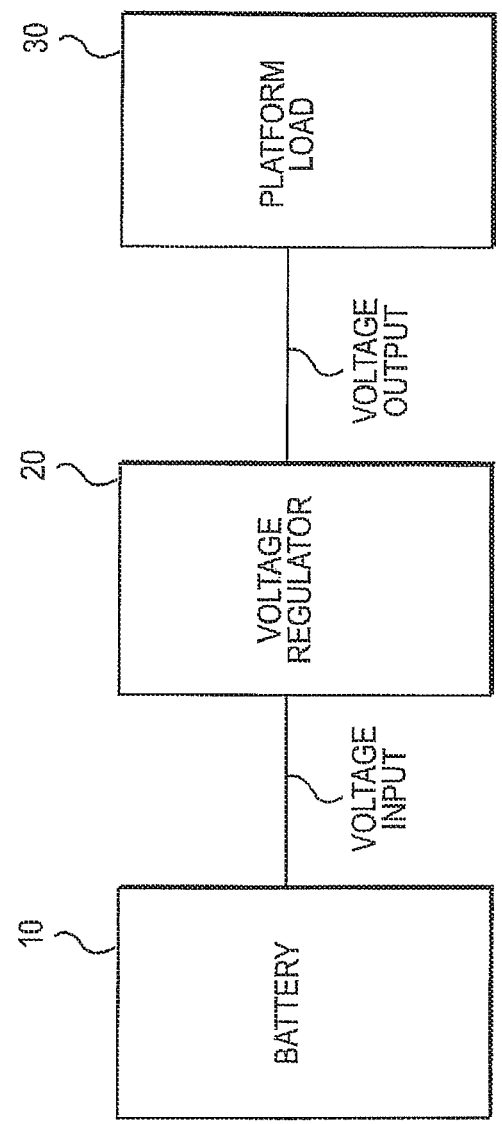
FIG. 1 shows an example of a power system for an electronic device.

In the following detailed description, like reference numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

The following description may relate to an electronic device that operates based on a battery consisting of two stacked cell blocks, each block consisting of one or more cells wired in parallel. The electronic device may be referred to as a platform load (or a computing platform). The platform load may include a processor based device including but not limited to a laptop, a netbook, a tablet and/or a mobile phone (or cellular phone). The platform load may include a processor for a mobile computer.

Figure 2:
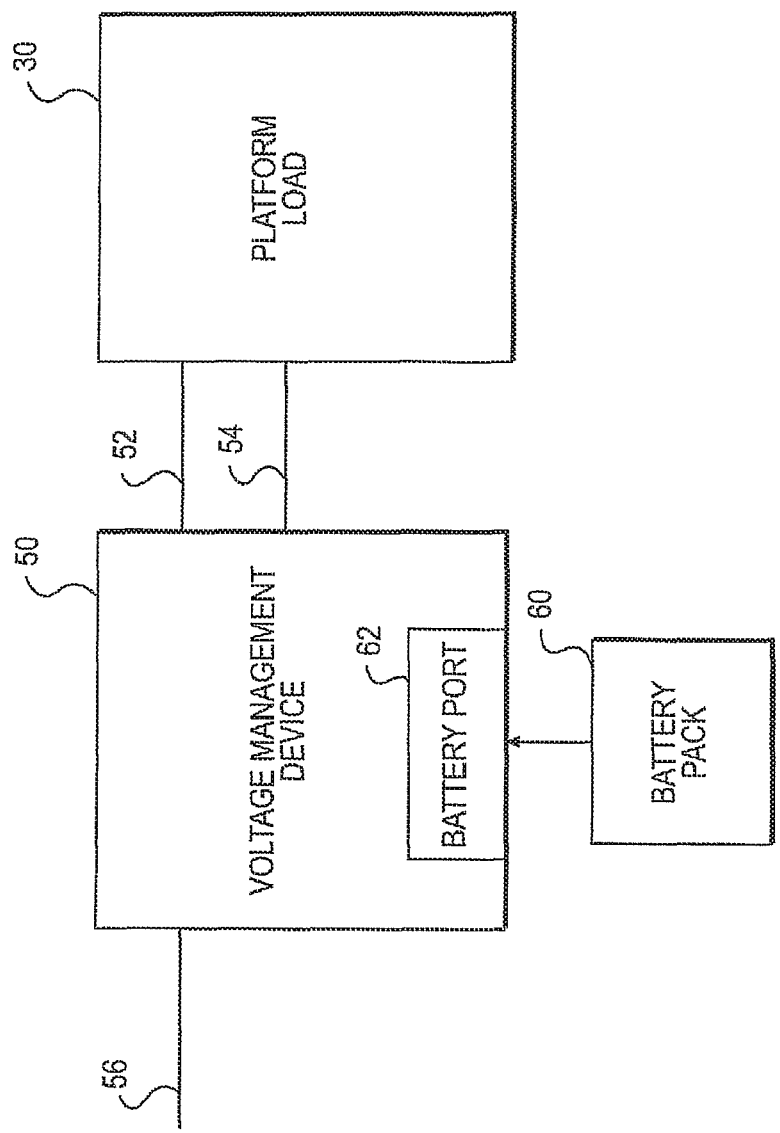
FIG. 2 shows a power system for a platform load according to an example embodiment.

FIG. 2 shows a power system for a platform load according to an example embodiment. Other embodiments and configurations are also within the scope of the present disclosure. The features of FIG. 2 may also be considered an apparatus, a system and/or an electronic device.

FIG. 2 shows a voltage management device 50 coupled to the platform load 30 by a high voltage rail 52 and a middle voltage rail 54. The middle voltage rail 54 may also be called a low voltage rail. The voltage management device 50 and the platform load 30 may be commonly coupled to ground (such as a ground voltage rail).

FIG. 2 also shows a battery port 62 to receive a battery pack 60 such as a stacked battery pack having an upper cell block and a lower cell block. As one example, the battery port 62 may be considered part of the voltage management device 50.

The voltage management device 50 may also receive a voltage 56 from another device, such as an adapter or an AC/DC converter, such as an AC/DC converter.

The voltage management device 50 may provide a high output voltage on the high voltage rail 52 to the platform load 30. The voltage management device 50 may provide a middle output voltage on the middle voltage rail 54 to the platform load 30.

The high output voltage on the high voltage rail 52 may be provided from a combination of the upper cell block and the lower cell block of the battery pack 60. The high output voltage on the high voltage rail 52 may be also provided based on the voltage 56. The middle output voltage on the middle voltage rail 54 may be provided from the lower cell block of the battery pack 60.

Figure 3:
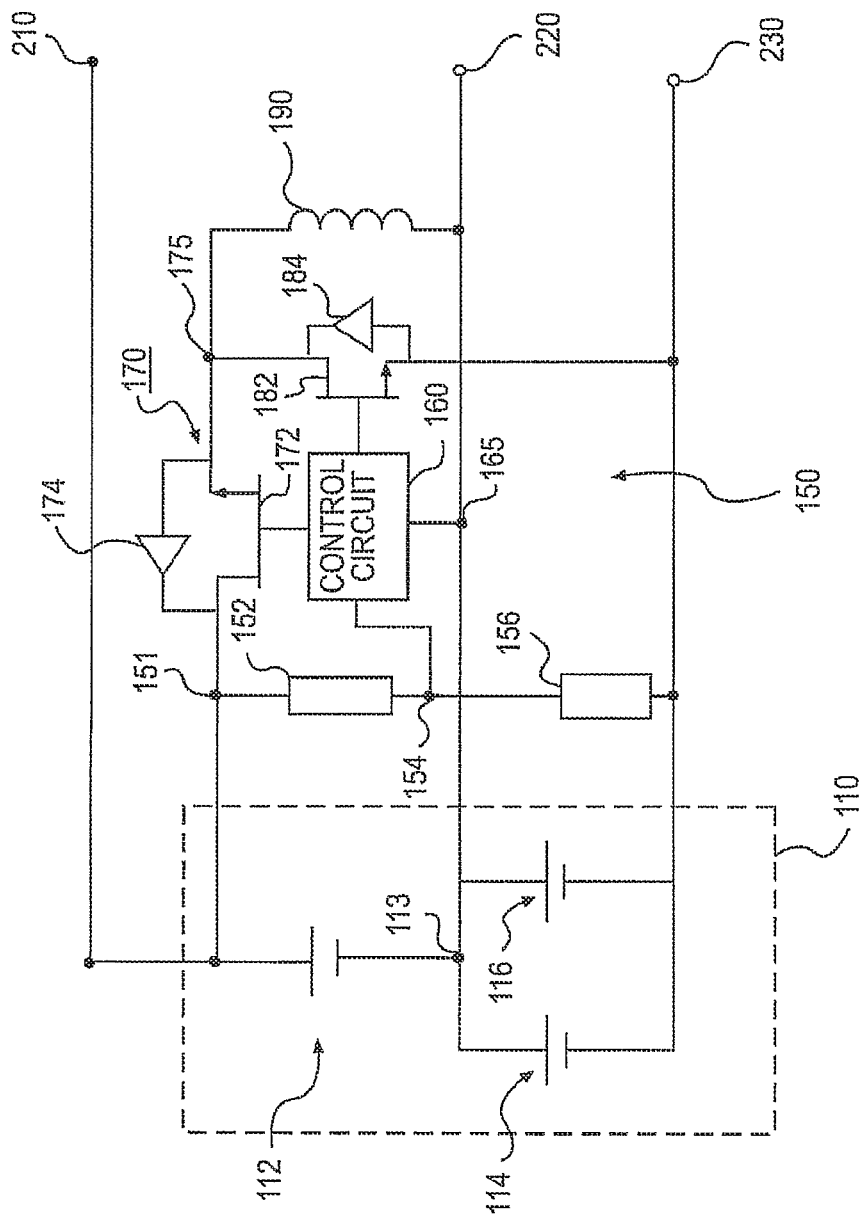
FIG. 3 shows a voltage management device that includes a stacked battery pack and voltage comparator according to an example embodiment.

FIG. 3 shows a voltage management device that includes a stacked battery pack and voltage comparator according to an example embodiment. Other embodiments and configurations may also be within the scope of the present disclosure. The voltage management device shown in FIG. 3 may correspond to the voltage management device 50 of FIG. 2. The features of FIG. 3 may also be considered an apparatus or system.

More specifically, FIG. 3 shows that the voltage management device includes a stacked battery pack 110 and a voltage management circuit 150. The stacked battery pack 110 and the voltage management circuit 150 may provide an output voltage to a platform load, such as the platform load 30 shown in FIGS. 1-2. The stacked battery pack 110 and the voltage management circuit 150 may provide a high output voltage on a high voltage rail 210 and may provide a middle output voltage on a middle voltage rail 220. A ground power rail 230 may provide zero volts or a ground voltage. The middle voltage rail 220 may provide a voltage that is half that of the high output voltage of the high voltage rail 210. This may be provided based on voltage in the stacked battery pack 110 and based on operations of the voltage management circuit 150, as will be described below.

The stacked battery pack 110 may include a first battery cell 112 (or block of parallel cells) stacked on a parallel set of battery cells, in this example, a second battery cell 114 and a third battery cell 116. The second and third battery cells 114 and 116 may be provided in parallel and may be considered a parallel pair. As an alternative, a larger single battery cell may be used in place of the parallel battery cells 114, 116. The first battery cell 112 may be commonly connected to the second and third battery cells 114, 116 at a common node 113. The first battery cell 112 may be considered an upper cell block of the stacked battery pack 110. The second battery cell 114 and the third battery cell 116 may be considered a lower cell block of the stacked battery pack 110. Other configurations of the battery pack 110 may also be provided.

The stacked battery pack 110 may be provided within a battery port to receive the battery pack 110. Accordingly, the battery pack may be removable from the power system.

The stacked battery pack 110 may provide a high output voltage on the high voltage rail 210 to a platform load. For example, the high voltage rail 210 may provide a high output voltage of approximately 6 volts to 8.4 volts. This high voltage may be an appropriate voltage for providing a driving voltage to the platform load.

However, the platform load may need a lower voltage than the high output voltage provided on the high voltage rail 210. As one example, a microprocessor (on the platform load) may need an input voltage of 1 volt. It may be inefficient to drive the microprocessor (i.e., the platform load) using the high output voltage on the high voltage rail 210. A more efficient technique may be to drive the microprocessor (i.e., the platform load) by using the middle output voltage on the middle voltage rail 220.

The middle output voltage provided on the middle voltage rail 220 may be also provided to the platform load. For example, the middle voltage rail 220 may provide a middle output voltage of approximately 3 volts to 4.2 volts. The voltage provided on the middle voltage rail 220 may correspond to the voltage at the common node 113 between the upper cell block and the lower cell block of the stacked battery pack 110.

The lower cell block of the battery pack 110 may have a higher energy content (due to the two battery cells 114, 116) as compared to the upper cell block of the battery pack 110 having a single battery cell (i.e., the first battery cell 112). It may be more efficient to drive the platform load using the middle voltage rail 220 as compared to using the high voltage rail 210. That is, the pair of battery cells 114, 116 may provide high capacity and high current to the middle voltage rail 220. The single first battery cell 112 may provide a lesser capacity by a higher voltage to the high voltage rail 210.

For reasons of efficiency, one would want to use all the energy in the battery pack 110 such that all three cells become exhausted at a same time.

The voltage management circuit 150 may establish whether the high output voltage and the middle output voltage vary within acceptable limits, and the voltage management circuit 150 may either buck or boost a balancing charge as necessary to maintain a balanced battery stack.

The voltage management circuit 150 may include a pair of resistors, namely a first resistor 152 and a second resistor 156 provided in series between a node 151 and a ground voltage rail 230. The first and second resistors 152 and 156 may have equal resistance. A mid-point node 154 is provided between the first resistor 152 and the second resistor 156 such that the first and second resistors 152, 156 have an equal resistance. The first resistor 152 is provided between the node 151 and the mid-point node 154. The second resistor 156 is provided between the mid-point node 154 and the ground voltage rail 230. The voltage at the mid-point node 154 may be a reference voltage Vref. The reference voltage Vref may represent an ideal voltage that should be provided between the upper cell block and the lower cell block of the stacked battery pack 110.

The voltage at the mid-point node 154 may be used to determine if the upper cell block of the battery pack is in balance with the lower cell block of the battery pack 110. In order for the upper cell block to be in balance with the lower cell block of the battery pack 110, the voltage at the mid-point node 154 should be equal to the voltage at the common node 113 (between the upper stack and the lower stack).

The voltage management circuit 150 may further include a control circuit 160, a buck converter 170 (or buck switch), a boost converter 180 (or boost switch) and a common inductor 190. The control circuit 160 may drive a reversible converter, which may include the buck converter 170, the boost converter 180 and the common inductor 190.

The control circuit 160 may be an integrated circuit (IC), for example.

The control circuit 160 may receive a first input based on a voltage at the mid-point node 154 between the first resistor 152 and the second resistor 156. For ease of description, the first input may be referred to as the reference voltage Vref. The control circuit 160 may receive a second input based on a voltage at a node 165 on the middle voltage rail 220. The voltage at the node 165 may correspond to the voltage at the common node 113 between the upper cell block and the lower cell block of the stacked battery pack 110. For ease of description, the second input may be called the actual voltage (or the actual middle voltage of the battery stack 110). The actual voltage may represent the actual voltage at the common node 113 between the upper cell block and the lower cell block of the stacked battery pack 110.

The control circuit 160 may compare the reference voltage Vref (provided from the mid-point node 154) with the actual voltage (provided from the node 165). Based on this comparison, the control circuit 160 may provide an output signal (or voltage) to either the buck converter 170 or the boost converter 180. Based on the comparison and the corresponding output signal, the control device 160 may help maintain a balance point between the upper cell block and the lower cell block of the battery pack 110.

As stated above, the control circuit 160 may drive the reversible converter. The reversible converter may boost energy up from the lower cell block (i.e., the second and third battery cells 114, 116) to the upper cell block (i.e., the first battery cell 112) when energy in the first battery cell 112 is getting depleted faster than energy in the battery cells 114, 116 of the lower cell block. On the other hand, when energy in the battery cells 114, 116 of the lower cell block are being depleted faster than energy in the first battery cell 112, then energy from the first battery cell 112 may be moved (or transferred) into the second and third battery cells 114, 116 of the battery pack 110. The transfer of energy to maintain the balance point is based on the buck converter 170 and the boost converter 180 (and the common inductor 190).

The buck converter 170 (or buck switch) may include a transistor 172 and a diode 174 coupled in parallel. The buck converter 170 may be considered a DC-to-DC converter that reduces a DC voltage. The boost converter 180 (or boost switch) may include a transistor 182 and a diode 184 coupled in parallel. The boost converter 180 may be considered a power converter (or step-up converter) in which an output DC voltage is greater than an input DC voltage. The inductor 190 may be considered as common to both the buck converter 170 and the boost converter 180.

Based on the comparison between the reference voltage Vref (provided from the mid-point node 154) and the voltage provided from the node 165, the control circuit 160 may provide a signal to operate transistors 172 and 182 to operate as a boost converter or a buck converter. If the voltage at the node 165 is found to be lower than the reference voltage at the node 152, then the second and third battery cells 114 and 116 have been depleted faster than the first battery cell 112. In this case, the transistor 172 acts as a switching transistor and the transistor 182 acts as a synchronous diode, thereby operating a buck function with the inductor 190 to channel current into the lower cell block (i.e., the second and third battery cells 114, 116). In the reverse situation, if the first battery cell 112 has become more depleted, the transistor 182 is driven as the switching transistor and the transistor 172 acts as the synchronous diode, creating a boost configuration with the inductor 190, and thereby channeling energy from the lower cell block (i.e., the second and third battery cells 114, 116) into the first battery cell 112. This may help maintain a balance point between the upper cell block and the lower cell block of the battery pack.

The voltage management circuit 150 may adjust energy provided within the battery pack 110 based on the middle output voltage on the middle voltage rail. The voltage management circuit 150 may adjust energy such that the middle output voltage provided on the middle voltage rail 220 is half of the high output voltage provided to the high voltage rail 210. This may provide a better distribution of energy within the stacked battery pack 110, and may provide a better efficiency of the stacked battery pack 110. This may help reduce problems resulting from the battery cells voltages within the stacked battery pack 110 from decaying at different rates. By balancing the voltages in the stack this way, the battery pack 110 may be able to utilize the energy available in all of the battery cells even in situations where the upper and lower cell blocks of the cell stack would otherwise deplete at different rates, leaving energy in one level of the stack while the other part of the stack has been completely depleted, causing system shutdown.

The control circuit 160 may control the buck converter 170 to transfer energy from the upper cell block to the lower cell block of the battery pack 110 when the control circuit 160 determines the voltage at the common node 113 (or the node 165) is less than the voltage at the mid-point node 154.

The control circuit 160 may control the boost converter 182 to transfer energy from the lower cell block to the upper cell block of the battery pack when the control circuit 160 determines the voltage at the common node 113 (or the node 165) is greater than the voltage at the mid-point node 154.

Embodiments may provide an improvement over poor efficiency of voltage regulators that receive a voltage input much higher than a voltage output.

Embodiments may provide a voltage management circuit to determine a state-of-balance between battery cells in a battery pack, and to provide an active charge balance to keep the battery stack balanced despite the possible non-matching of battery cells in the battery pack.

Embodiments may allow tapping a voltage a center of the battery pack. This may enable all battery cells in the battery pack to remain in balance and that substantially no charge may be unused when the complete battery pack is exhausted.

An optimum capacity of the particular battery cells may be calculated based on an estimation of a most-likely current consumption at the middle and high power rails. The active balance may adjust any variance to that in real-time.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprising:
    a first terminal to couple to a first node of a stacked battery pack having a first cell block and a second cell block;
    a second terminal to couple to a second node between the first cell block and the second cell block; and
    a voltage management circuit to detect an output voltage at the second terminal and to adjust energy within the battery pack based on the output voltage to be detected at the second terminal, the voltage management circuit includes a control circuit, and a buck converter or a boost converter, the control circuit uses the buck converter to transfer energy from first cell block to the second cell block, or the control circuit uses the boost converter to transfer energy from the second cell block to the first cell block.

2. The apparatus of claim 1, wherein the voltage management circuit to adjust the energy within the battery pack such that the battery pack to output, at the second terminal, the output voltage that is substantially at a predetermined level relative to a voltage to be output at the first terminal.

3. The apparatus of claim 2, wherein the battery pack has two cell blocks, and the voltage management circuit to adjust the energy such that the output voltage at the second terminal is substantially half of the output voltage to be output at the first terminal.

4. The apparatus of claim 1, wherein when the voltage management circuit includes the buck converter, the control circuit is to compare a voltage at the second terminal with a reference voltage, and the control circuit to control the buck converter to transfer energy from the first cell block to the second cell block in response to the comparison.

5. The apparatus of claim 1, wherein the voltage management circuit includes a first resistor, a second resistor and a node between the first resistor and the second resistor to generate the reference voltage.

6. The apparatus of claim 1, wherein when the voltage management circuit includes the boost converter, the control circuit is to compare a voltage at the second terminal with a reference voltage and the control circuit to control the boost converter to transfer energy from the second cell block to the first cell block in response to the comparison.

7. The apparatus of claim 6, wherein the voltage management circuit includes a first resistor, a second resistor and a node between the first resistor and the second resistor to generate the reference voltage.

8. The apparatus of claim 1, wherein the boost converter and the buck converter include a common inductor.

9. An apparatus comprising:
    a platform load;
    a first voltage rail to supply a first voltage from a first node of a battery pack to the platform load, the battery pack having a first battery cell and a second battery cell with a second node in between;
    a second voltage rail to supply a second voltage from the second node to the platform load; and
    a voltage management circuit to detect the second voltage at the second voltage rail and to adjust energy within the battery pack based on the second voltage, the voltage management circuit includes a control circuit, and a buck converter or a boost converter, the control circuit uses the buck converter to transfer energy from the first battery cell to the second battery cell, or the control circuit uses the boost converter to transfer energy from the second battery cell to the first battery cell.

10. The apparatus of claim 9, wherein the voltage management circuit to adjust the energy within the battery pack such that the battery pack to output, at the second voltage rail, a voltage that is substantially at a predetermined level relative to a voltage to be output at the first voltage rail.

11. The apparatus of claim 10, wherein the battery pack has two cell blocks, and the voltage management circuit to adjust the energy such that the output voltage at the second voltage rail is substantially half of the output voltage to be output at the first voltage rail.

12. The apparatus of claim 9, wherein when the voltage management circuit includes the buck converter, the control circuit is to compare a voltage at the second voltage rail with a reference voltage and the control circuit to control the buck converter to transfer energy from the first battery cell to the second battery cell in response to the comparison.

13. The apparatus of claim 9, wherein when the voltage management circuit includes the boost converter, the control circuit is to compare a voltage at the second voltage rail with a reference voltage and the control circuit to control the boost converter to transfer energy from the second battery cell to the first battery cell in response to the comparison.

14. An apparatus comprising:
   a first voltage rail;
   a second voltage rail;
   a platform load to couple to the first voltage rail and the second voltage rail;
   a stacked battery pack having a first cell block and a second cell block separated by a node, the stacked battery pack to provide a first output voltage on the first voltage rail and to provide a second output voltage on the second voltage rail; and
   a voltage management circuit to detect the second output voltage at the second voltage rail and to adjust the second output voltage on the second voltage rail based on the detected second output voltage, the voltage management circuit includes a control circuit, and a buck converter or a boost converter, the control circuit uses the buck converter to transfer energy from the first cell block to the second cell block, or the control circuit uses the boost converter to transfer energy from the second cell block to the first cell block.

15. The apparatus of claim 14, wherein the voltage management circuit to adjust the energy within the battery pack such that the battery pack to output, at the second voltage rail, a voltage that is substantially at a predetermined level relative to a voltage to be output at the first voltage rail.

16. The apparatus of claim 15, wherein the battery pack has two cell blocks, and the voltage management circuit to adjust the energy such that the output voltage at the second voltage rail is substantially half of the output voltage to be output at the first voltage rail.

17. The apparatus of claim 14, wherein when the voltage management circuit includes the buck converter, the control circuit is to compare a voltage at the second voltage rail with a reference voltage and the control circuit to control the buck converter to transfer energy from the first cell block to the second cell block in response to the comparison.

18. The apparatus of claim 14, wherein when the voltage management circuit includes the boost converter, the control circuit is to compare a voltage at the second voltage rail with a reference voltage and the control circuit to control the boost converter to transfer energy from the second cell block to the first cell block in response to the comparison.

* * * * *